July 18, 1967

F. A. FIELDER ETAL 3,331,126

ASSEMBLING APPARATUS AND METHOD

Filed Feb. 8, 1963

INVENTORS
FREDERICK A. FIELDER
ALAN R. HANSON
DONALD F. KAPPEL
JOHN W. SWENSON

BY *Thomas J. Nikolai*

ATTORNEY

INVENTORS
FREDERICK A. FIELDER
ALAN R. HANSON
DONALD F. KAPPEL
JOHN W. SWENSON
BY Thomas J. Nikolai
ATTORNEY

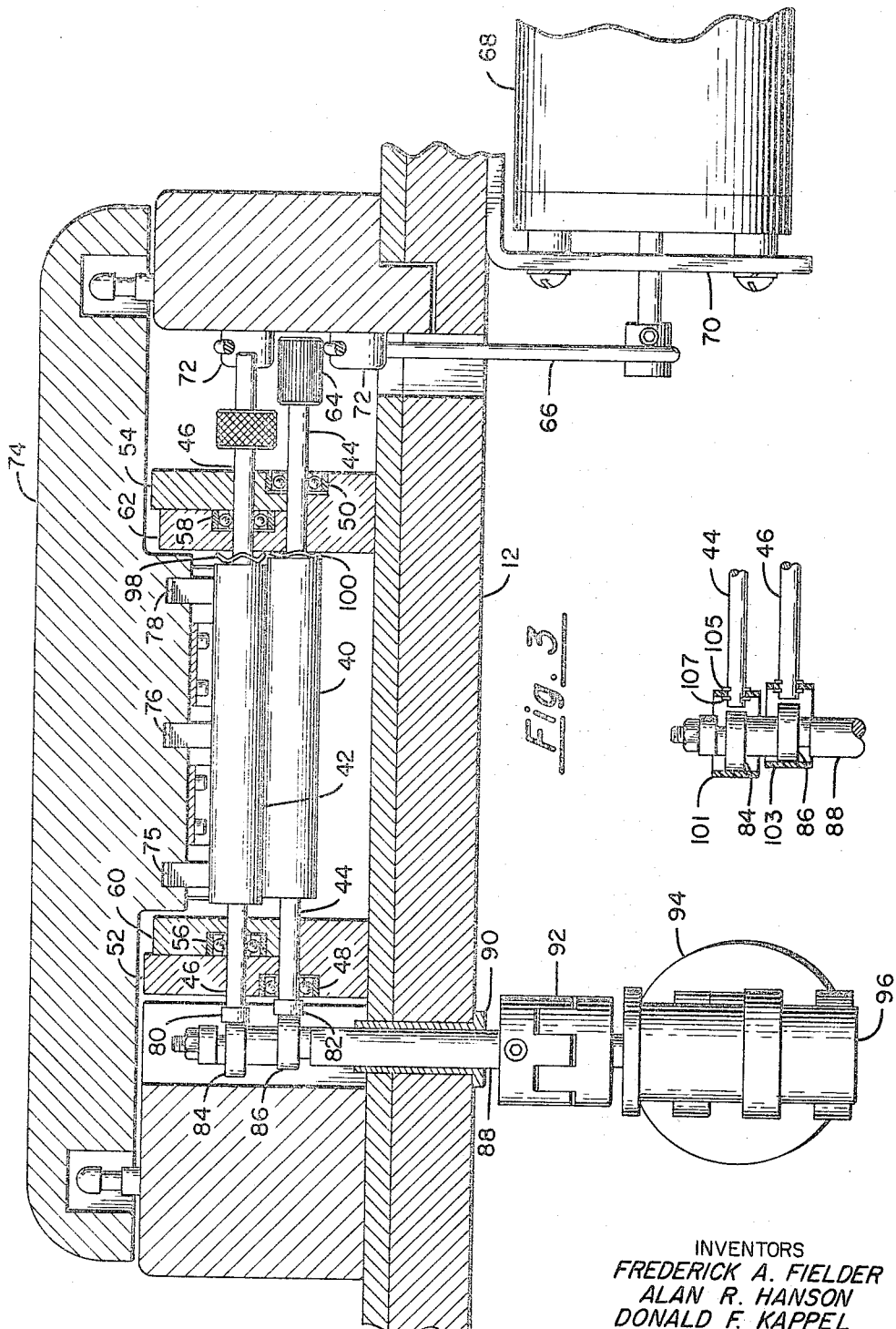

July 18, 1967  F. A. FIELDER ETAL  3,331,126
ASSEMBLING APPARATUS AND METHOD
Filed Feb. 8, 1963  5 Sheets-Sheet 4

INVENTORS
FREDERICK A. FIELDER
ALAN R. HANSON
DONALD F. KAPPEL
JOHN W. SWENSON
BY Thomas J. Nikolai
ATTORNEY

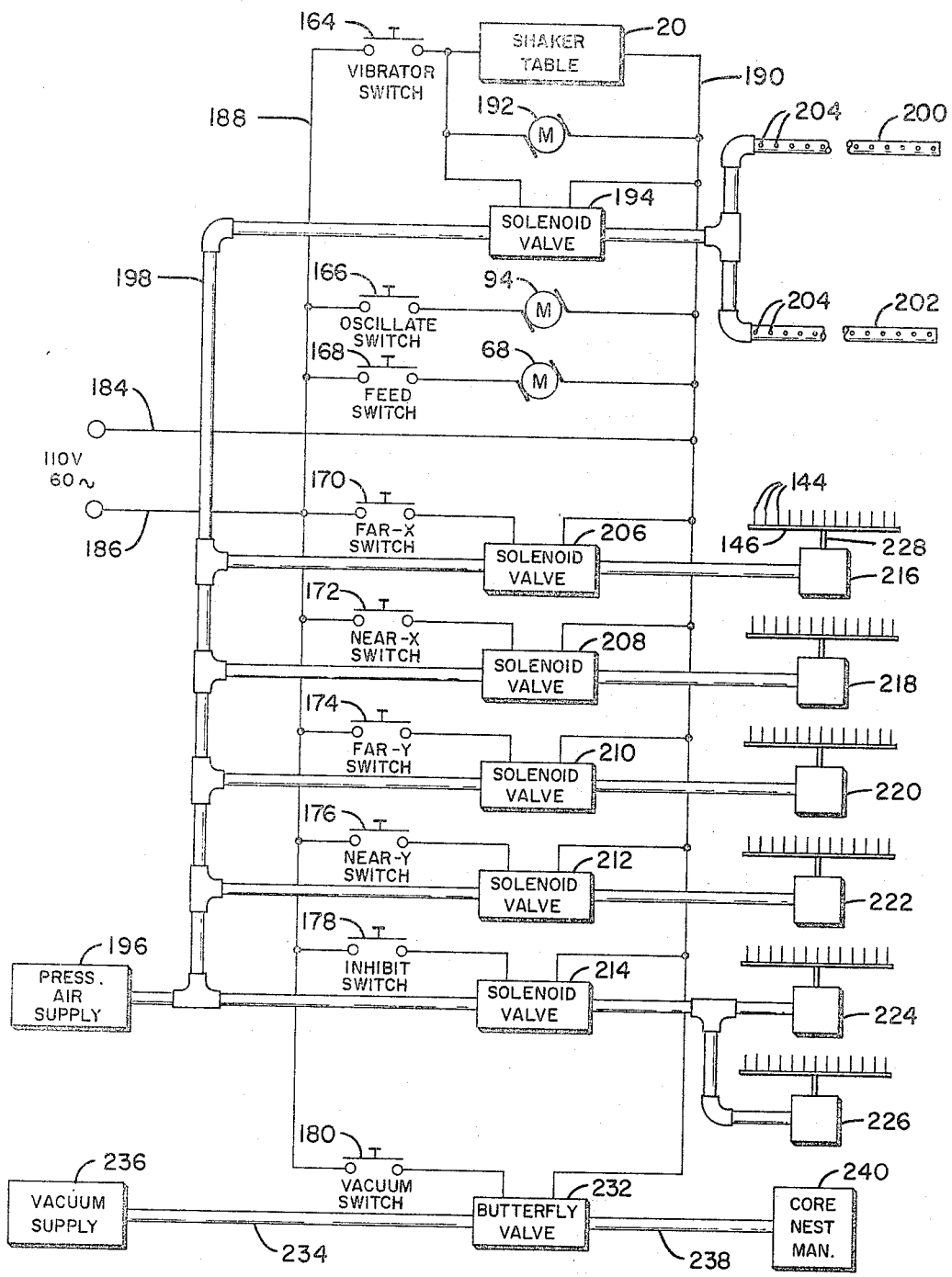

United States Patent Office 3,331,126
Patented July 18, 1967

3,331,126
ASSEMBLING APPARATUS AND METHOD
Frederick A. Fielder, St. Paul, Alan R. Hanson, Minneapolis, Donald F. Kappel, Inver Grove Township, Dakota County, and John W. Swenson, St. Paul, Minn., assignors to Sperry Rand Corporation, New York, N.Y., a corporation of Delaware
Filed Feb. 8, 1963, Ser. No. 257,149
20 Claims. (Cl. 29—603)

This invention relates generally to apparatus for threading an elongated filament through apertured elements, and more specifically to a machine for stringing a plurality of apertured elements on one or more lines.

In the digital data processing art, it has been found convenient to employ a large plurality of bistable ferromagnetic elements for storing information. These magnetic elements are generally toroidal in shape and are arranged in a matrix array of rows and columns. In order to supply the required magnetic fields for operating such memories, it is necessary that a plurality of current carrying conductors be threaded through the apertures of the toroidal cores. In present day coincident current magnetic core memories, each column of cores is threaded with a so-called Y-drive line and each row is threaded with an X-drive line and an Inhibit drive line. By applying currents of predetermined magnitude to these lines it is possible to read information into or out of memory.

A typical size for a magnetic core employed in present day computer memories is a toroid having an outside diameter of 0.050 inch and an inside diameter of 0.030 inch. Furthermore, a typical magnetic core matrix plane may consist of thousands of these tiny ferrite core elements suspended by the grid made up of the aforementioned X, Y and Inhibit drive lines, said grid being attached to a printed circuit frame to which external electrical connections can be made. The drive lines are generally extremely fine copper wires and, for example, may be in the range between 38 and 42 gauge. In the past, it has been necessary to thread these matrix planes by hand assembly methods. Because of the cross extremely small size and because of the large number employed, this hand assembly method was tedious, costly, time consuming and unreliable.

One approach for mechanizing the assembly of magnetic core matrices is described in an article entitled "Wire Inserting Machine" by Walter P. Shaw, which appeared in the December 1958, issue of Automation at page 51. In this article there is described a device which includes means for holding a plurality of cores in a desired coordinate configuration with the apertures of each core in the array being aligned in two intersecting rows. Prior to the insertion of the drive wires through the apertured cores in a plurality of parallel rows, a set of hollow hypodermic needles were first inserted through all of the apertures of the cores in these rows. Subsequently, the drive wire itself was driven through the center of the hypodermic needles and clamped after emerging therefrom. Finally, the hypodermic needles were withdrawn leaving only the drive wires threaded through the cores in all of the rows.

While the above mentioned approach may work successfully with larger size core elements, as the size of the magnetic core is decreased, problems arise due to the fact that the hypodermic needle occupies a substantial portion of the area of the aperture of the cores. In attempting to force the hypodermic needle through the core there is a likelihood that the cores will be chipped or broken. Also, due to friction, as the hypodermic stock is removed from the wires, there is a likelihood that the fine wires will be stretched and broken or withdrawn with the hypodermic stock.

The apparatus of the present invention obviates this problem by providing a means for stringing magnetic core arrays such that there is no need for hypodermic needles to guide the drive wires through the array. This is accomplished by providing a novel motion to the drive wires themselves as they are advanced through the plurality of cores. More specifically, the present invention provides a plurality of spools for holding the continuous filaments or wires and means for holding the magnetic cores with the apertures in an aligned relationship with one another in a plurality of rows. A pair of drive rollers, which frictionally engage the wires to be threaded through the cores, is arranged to unwind the wires from the spools and to advance the wires for all of the rows simultaneously through the aligned cores. As the wires are advanced a reversing rotational motion is imparted to the wires about the longitudinal axes thereof, the result being that the wires tend to seek out the apertures in the cores and pass therethrough. To decrease the frictional drag between the spools themselves and between the spools and the trays in which they are mounted, the machine of this invention includes a device for vibrating the spools and applying an air cushion between spools such that they tend to float in a relatively friction-free manner. Hence, the problem of wire breakage and elongation is obviated. Additionally, the machine of the present invention employs means for securing the wired grid to a printed circuit frame.

It is accordingly the primary object of the present invention to provide new and improved apparatus for threading a plurality of continuous filaments or wires simultaneously through a plurality of apertured elements.

It is another object of this invention to provide an improved machine for automatically wiring magnetic core matrices.

Still another object of this invention is to provide, in a machine of the type described, a means for locating the extremities of the wires threaded through the cores to the respective circuit terminations on a printed circuit frame.

A further object of the present invention is to provide an automatic machine for threading magnetic cores wherein the need for hypodermic needles or other wire stiffeners to guide the wires is dispensed with.

A still further object of this invention is to provide a novel driving arrangement for a plurality of continuous filaments wherein the filaments are both translated and rotated.

A yet still further object of this invention is to provide a filament dispenser having very low frictional resistance and electrostatic interface attraction.

The foregoing objects, advantages, construction and operation of the present invention will become more readily apparent from the following description and accompanying drawings, in which:

FIG. 1 is a perspective view of the core threading machine of the present invention;

FIG. 3 is a sectional view taken along the line 3—3 of FIG. 2;

FIG. 3a is an alternative arrangement of certain apparatus shown in FIGURE 3;

FIG. 5 is a schematic diagram showing the electrical and pneumatic circuit employed in the apparatus of the present invention.

Figure 2:
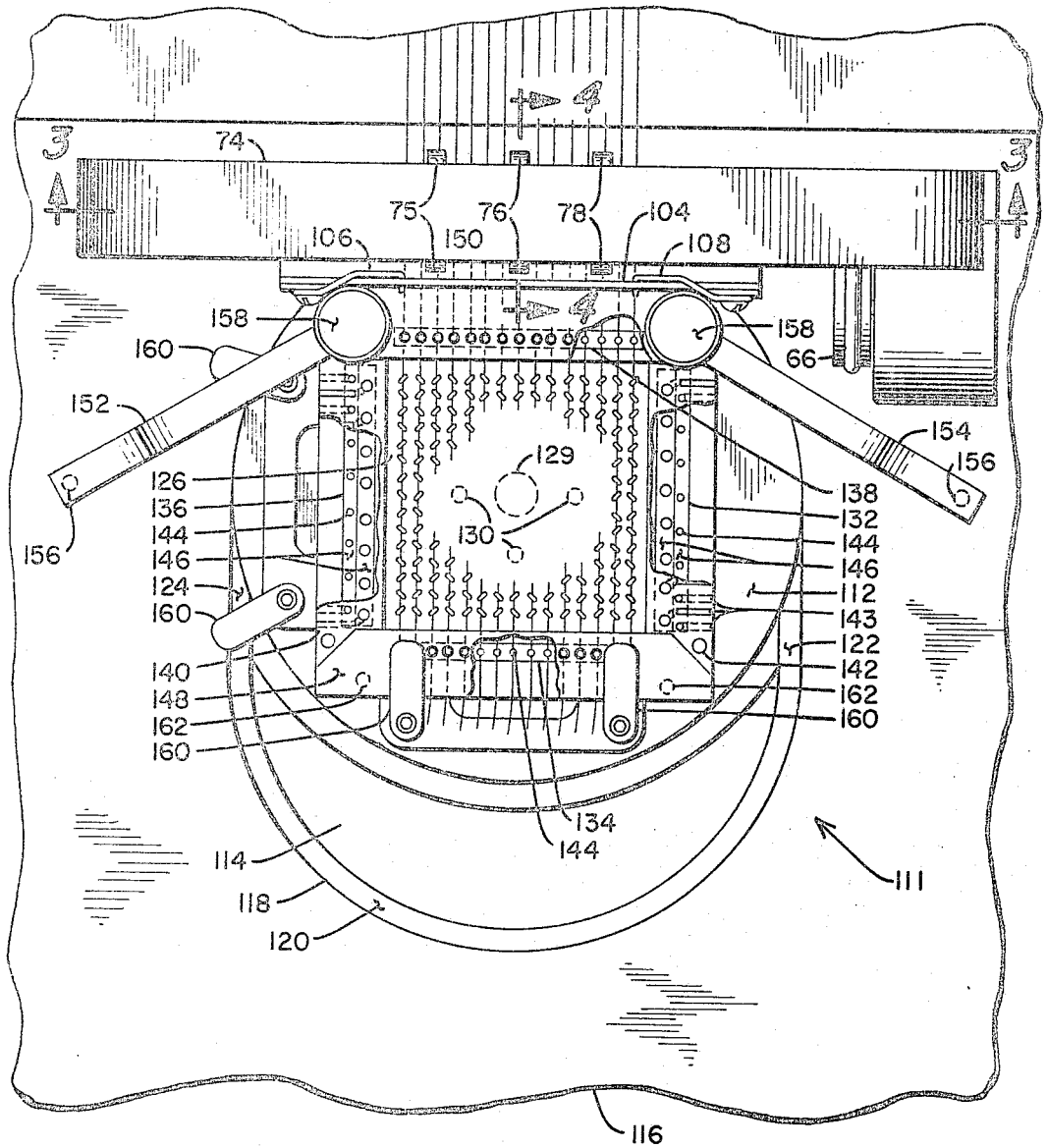
FIG. 2 is a plan view of a portion of the core stringing machine.

Referring now to FIG. 1, it will be seen that in accordance with the present invention a wiring machine may comprise a cabinet indicated generally by the numeral 10 having welded frame members (not shown) supporting a substantially flat table or surface 12. Attached to the frame on all four sides are decorative panels such as panels 14 and 16. Contained within the cabinet formed by the frame and the panels are the various motors, solenoid controlled air valves, and air cylinders which control the operation of the filament threading machine of this invention. The operation of the above mentioned control devices will be more fully described when the details of the apparatus of FIG. 5 are explained.

A rectangular opening 18 is located at the rear portion of the table 12. Supported immediately below this opening is the vibrating surface of a shaker table 20. One such table which has proved suitable for use in the machine of the present invention is the Model PJ15 Shaker Table manufactured by the Syntron Company of Homer City, Pa. It should be understood, however, that limitation to this particular vibrating table is not intended. The shaker table employed in an exemplary embodiment of the invention is provided with a means for controlling the amplitude of the vibration imparted to its table surface. Bolted to the top surface of the vibrating table 20 are a plurality of trays 22 and 24 having troughs therein adapted to hold a plurality of individual spools 26. The number of troughs and the number of spools per trough is determined by the number of filaments to be simultaneously threaded. Each trough on a tray is on a slightly higher plane in going from front to back such that the filaments from the spools in one trough pass over the top of the trays located in front of it. Similarly, each tray is on a slightly higher plane. The spools 26 have a central aperture passing therethrough such that they may be located on a rod (not shown). The central aperture, however, is substantially larger than the diameter of the rods so that the spools themselves rest in the trays and are not supported by the rods as a wheel is supported by an axle. The ends of the rods, are, in turn, affixed to the sides of the trays 22 and 24.

Figure 4:
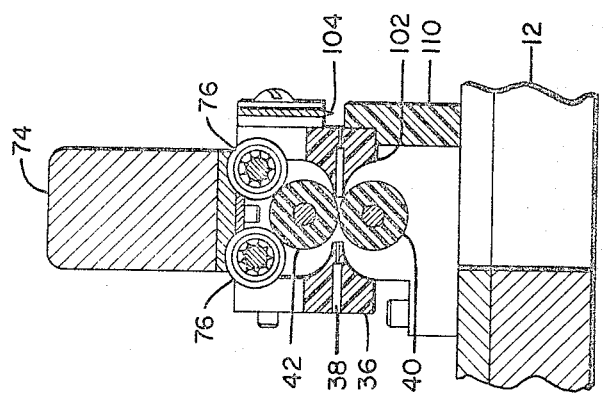
FIG. 4 is a sectional view taken along the line 4—4 in FIG. 2.

Located approximately midway between the front and rear of the surface 12 is a first set of drive rollers including a top roller 28 and a bottom roller 30. The rollers are journalled by means of half-sleev bearings in a conventional manner in the bearing blocks 32, said bearing blocks being bolted to the table 12. The wires or filaments from the spools pass between the top roller 28 and the bottom roller 30 and are frictionally engaged thereby, so that when said rollers are rotated all the wires are simultaneously unwound from the spools 26. The rollers 28 and 30 also serve to confine the filaments from all the spools into a single horizontal plane which is parallel to the surface of the table 12. After passing through the rollers 28 and 30 the filaments are threaded through a suitable guide member 34 which may be comprised of a block of plastic or other suitable material having a plurality of equally spaced apertures along the length thereof. The guide member 34 serves to constrain the filaments so that they travel in paths which are parallel to one another. After passing through the guide member 34 the wires are fed through a rear wire guide 36 (FIG. 4). The rear wire guide 36, like the guide member 34, may be formed from a block of suitable material such as a plastic block having a plurality of apertures 38 drilled therethrough, the spacing between adjacent apertures being substantially the same as the distance between the apertures on the guide member 34. It can be seen, then, that the combination of the guide member 34 and the rear wire guide 36 serves to constrain the plurality of wires to parallel paths.

Referring still to FIG. 4 and also to FIG. 3, it may be seen that in accordance with the present invention the primary wire feeding structure may comprise a lower drive roller 40 and an upper driven roller 42. The rollers 40 and 42 are mounted on their respective shafts 44 and 46 and are preferably formed out of steel and have a coating of a suitable material for enhancing the frictional properties of said rollers. A coating material which has proved successful in an exemplary embodiment of this invention is a 0.004 inch thickness of polyvinyl chloride, but other materials may also be used. The thin coating of polyvinyl chloride was chosen for it has a desired durometer to insure reasonable length of service as well as a proper gripping of the filaments passing between the rollers.

The shaft 44 of the drive roller 40 passes through a set of magneto type bearings 48 and 50 located in their respective bearing block members 52 and 54. Similarly, the shaft 46 of the driven roller 42 passes through a set of magneto type bearings 56 and 58 located in their respective bearing mounting blocks 60 and 62. The dimension of the bearing blocks 52, 54, 60 and 62 are such that the rollers 40 and 42 are parallel, one above the other. The shaft 44 extending from the right hand side of roller 40 has a knurled cylindrical member 64 keyed to it. This knurled member serves as a pulley and is positioned to ride against a rubber O-ring belt 66 which is adapted to be rotated by a suitable gear motor 68. The motor 68 is suspended by a bracket 70 from the underside of the table 12. The O-ring belt passes upward through a slot provided in the table and is supported and routed by a set of idler rollers 72. The shaft of the gear motor 68 is suitably geared so as to rotate at a relatively slow speed. In the preferred embodiment of the present invention the motor 68 is arranged to drive the roller 40 at a relatively slow speed; for example, under twenty-five revolutions per minute.

When the filaments to be driven are placed between the drive roller 40 and the driven roller 42, the motion of the drive roller 40 causes the filaments to be advanced. Since the driven roller 42 rides on the filaments it is also rotated. To insure good contact between the drive roller 42 and the filaments passing between the two rollers a pressure arm assembly 74 is provided. The pressure arm 74 is provided with a plurality of sets of roller bearings 75, 76 and 78 on the bottom portion thereof. These roller bearings are arranged to ride on the driven roller 42 and tend to force the roller 42 more firmly against the filaments which pass between the two drive rollers yet permit the driven roller to turn.

The end portions of the shafts 44 and 46, which extend through the bearings 48 and 56 are provided with nylon caps 80 and 82 which serve as cam followers. The cams 84 and 86 against which these followers are positioned are ball bearings and are mounted eccentrically on a cam shaft 88. The shaft 88 passes upward through a sleeve bearing 90 mounted in the table 12. It is driven through a flexible coupling 92 by means of a motor 94 acting through a right angle drive assembly 96. The motor 94 preferably drives the shaft 88 at a relatively high speed compared to the speed of rotation of the drive rollers; for example, at a speed of 1,520 revolutions per minute. It should be understood, however, that the speed of rotation of the cam shaft 88 is not too critical and no limitation to the exemplary speed mentioned is intended.

The eccentric portions of the cam shaft 88 are designed such that the cams 84 and 86 impart equal and opposite cyclic motion to the rollers 40 and 42 in a direction transverse to the direction in which the filaments are advanced as the drive roller 40 is rotated about its shaft 44. Stating it another way, the cam 84 causes the roller 42 to move 180° out of phase with respect to the motion of the roller 40 produced by the action of the cam 86 riding on cam follower 80. A pair of leaf type springs 98 and 100 serve to bias the respective cam followers 80 and 82 up against their associated cams 84 and 86.

FIGURE 3a illustrates an alternative arrangement for imparting the oscillatory motion to the rollers 40 and 42 wherein the need for leaf type springs 98 and 100 for maintaining the cam followers in contact with the cams is dispensed with. In this alternative arrangement the ends of the roller shafts 44 and 46 are respectively secured to tie rods 101 and 103 by means of opposed C-rings 105 and 107 which fit into grooves provided in the shafts 44 and 46. The tie rods 101 and 103 are preferably U-shaped and formed from nylon and are arranged to cooperate with the bearings 84 and 86 mounted eccentrically on the cam shaft 88. Because of the clamping action of the C-rings 105 and 107 on the tie rods 101 and 103 a positive reciprocating push-pull motion is imparted to the roller shafts without the use of springs to keep the cams in contact with the cam followers.

The back-and-forth reciprocating motion of the drive rollers 40 and 42 causes the wires with which the rollers are in contact to be rotated alternately clockwise and counterclockwise without changing their relative parallel position. That is, the wires or filaments are rotated about an imaginary axis which runs through the center of the wires and no displacement thereof takes place along the axial direction of the drive rollers. There is no friction created between the two rollers themselves by this motion because the two rollers are not in actual contact but only are in contact with the filaments.

Referring again to FIG. 4, after the filaments pass between the drive roller 40 and the driven roller 42, they are routed through a forward wire guide 102. The forward guide member 102 is similar in construction to the rear wire guide 36 in that it is an elongated block of plastic or other suitable material having a plurality of equally spaced apertures extending along the length thereof. The spacing between apertures corresponds to the center-to-center spacing between two cores in adjacent rows in the matrix. The combination of rear wire guides and forward guides insures that the filaments passing therethrough are maintained in parallel relationship with one another. The number of holes in the guides 36 and 102 are equal in number to the number of rows and/or columns in the matrix that it is desired to wire.

After passing through the forward wire guide 102 the filaments pass underneath a cutting blade 104 which is mounted for vertical movement and normally held in the position illustrated by means of spring members 106 and 108 (FIG. 2). Located immediately below the knife blade 104 is an anvil block 110 which is made from nylon or some other suitable material which will not cause undue wearing of the knife blade. The block 110 serves as a supporting surface for the plurality of filaments as the knife blade 104 is depressed downward, thus insuring a clean cut of the filaments.

Adapted to be positioned immediately in front of the cutoff knife is a core nest holding assembly indicated generally by the numeral 111. The core nest holding assembly includes a circular plate 112 having an inwardly extending groove around the periphery thereof intermediate upper and lower circular surfaces of the plate. This circular plate is adapted to be mounted in an opening 114 provided in the surface 116 of the shelf 117 extending from the front of the cabinet 10. Extending outwardly from the walls 118 of the opening 114 is a track 120 which is generally oval shaped but has a set of opposed segments 122 and 124 which run parallel to one another and fit into the groove of the circular plate 112. Thus, the plate 112 may be manually slid back-and-forth along the parallel tracks and rotated when the circular plate 112 is in its forwardmost position. It is only when the table is in this last-mentioned position that the apparatus mounted on the turntable will clear the knife blade assembly 104 and the cutting block 110.

The core nest 126, itself, is preferably a block of honeycomb aluminum, the top surface of which is covered with plastic or other suitable material having a predetermined pattern of notches formed thereon. These notches are dimensioned to hold toroidal magnetic cores on edge with the aperture of each core aligned along a column and also along a row. In other words, the notches are placed at an angle of approximately 45° with respect to a set of rectangular coordinates as shown in FIG. 2 so as to locate the cores at the proper angle and depth so as to present an unobstructed passage to the threading filaments. In the bottom surface of each of the notches there is provided a small orifice which passes through the thickness dimension of the plastic cover of the core nest into the honeycomb block. The nest is adapted to be mounted on the top surface of a vacuum box of manifold 128. The vacuum applied to the honeycomb block serves to hold the cores in an upright position in the notches during the wire threading process.

The manifold 128 referred to above is secured to the circular plate of turntable 112 and is comprised of four sizes and a bottom. In the bottom surface of the manifold 128 is a fitting 129 adapted to be connected to the vacuum source as shown in FIG. 2. The core nest 126 fits within the rectangular opening defined by the four sides of the manifold and is held in registration by means of a plurality of indexing pins 130 also located in the bottom surface of the block. These pins are arranged to fit into corresponding apertuers in the core nest itself. Each of the four sides of the manifold 128 is provided with a rectangular cutout section 132, 134, 136 and 138. These openings permit the passage of the X, Y and Inhibit pull-down needles, yet to be described, to pass therethrough.

Prior to inserting the core nest within the core nest manifold it is loaded with toroidal cores. To facilitate the loading operation, the core nest is mounted on a vacuum manifold which, in turn, affixed to a vibrator. Magnetic cores are poured on the surface of the core nest and are vibrated until they fall into or near an unoccupied notch. The applied vacuum sucks the cores into the notches and holds them in an upright position. When all the notches are filled, the nest is removed from the loading device and inserted into the manifold of the core stringing machine.

Next, a printed circuitf rame 140 is placed around the core nest 126 and is held in proper registration with respect thereto by means of the indexing pins 142. This frame contains the conductive land areas or tabs 143 to which the extremities of the threaded wires are to be ultimately attached. Certain of the tabs in the printed circuit frame have apertures drilled through them through which a set of pull-down needles 144 are arranged to pass.

The operator next positions a pair of slotted transfer bars 148 and 150 on top of the printed circuit frame and clamps them in place. The means for clamping the rear slot transfer bar 150 are the swivel arms 152 and 154. These arms are arranged to swivel about a pin 156 which passes through the shelf 116 (FIG. 1) and into the base of the arm. By turning the screws 158 pressure is brought to bear on the rear slotted transfer bar 150 to hold it tightly against the printed circuit frame. In a similar mannor, the forward slotted transfer bar 148 is held against the printer circuit frame by means of the clamps 160. The transfer bars themselves are formed from a block of plastic or other suitable material and have grooves on the bottom surfaces thereof through which the filaments may pass as they are advanced through the core array. In order to line up the slots in the transfer bars 148 and 150 with the apertures in the cores, indexing pins such as pins 162 are provided. These pins fit into accurately dimensioned holes in the transfer bars.

Referring now to FIG. 5, in which is illustrated schematically the electrical and pneumatic controls for operating the core stringing machine of this invention, it can be seen that the operator is provided with a plurality of push button switches 164 through 180 for controlling the operation of the machine. As is shown in FIG. 1, these switches are mounted on a control panel in the front portion of the machine within easy reach of the operator. By closing one or more of the push button switches, certain of the electrically controlled devices are connected to an alternating current source by way of the conductors 184 and 186 and the bus members 188 and 190. For example, when the switch 164 is closed, current is supplied to the shaker table 20, to a motor 192 and to a solenoid controlled pneumatic valve 194. The motor 192 is the means employed to drive the rollers 28 and 30. By electrically connecting the shaker table 20 in parallel with the motor 192, it is insured that the spools 26 will be vibrated as the filaments are unwound therefrom. As was earlier described, by vibrating the trays, the spools therein tend to float so that the frictional drag between the spools themselves and between the spools and the troughs in which they are supported is considerably reduced. Hence, when the motor 192 drives the rollers 28 and 30, there is no chance of stretching or breaking the filaments as they are unwound from the spools. The solenoid valve 194 is also connected in parallel with the shaker table 20 and the motor 192 so as to be energized upon the closure of the switch 164. When the solenoid valve 194 is energized, the valve therein is open to permit pressurized air from a source 196 to flow through the tubing 198 to the rods 200 and 202 passing through the central apertures of the spools. As has already been mentioned, the rods on which the spools are mounted are preferably metal tubes having a plurality of apertures 204 drilled through the walls thereof. The flow of air through the holes in the rods serve to further reduce any frictional drag and electrostatic attraction between the spools to insure relatively friction-free unreeling.

By depressing the push button 166 the operator is able to energize the motor 94. It is this motor that is used to drive the cams 84 and 86 of FIG. 3 to produce rotational notice of the filaments as they are advanced through the drive rollers 40 and 42.

The switch 168 is the means employed to selectively energize the gear motor 68. It may be recalled that it is motor 68 which rotates the driven roller 40 to cause the filaments passing between the roller 40 and the drive roller 42 to be advanced into the apertured elements contained in the core nest.

The push button switches 170 through 178 are individually connected to a set of solenoid controlled valves 206 through 214. These valves, in turn, control the flow of air from the source 196 to the cylinders 216 through 226. Connected to the actuator rods 228 of this last mentioned group of cylinders are the support members 146 to which the pull-down needles 144 are attached. As illustrated in FIG. 2, the slots 134 and 138 in the core nest manifold each accommodate a single support member 146. The needles 144 projecting upward therefrom are adapted to pass through apertures provided in the printed circuit board frame member. The needles passing upward through the slots 138 are referred to herein as the Far-Y pull-down needles while those projecting upward from the support member 146 located in the slot 134 are referred to as the Near-Y pull-down needles. The slots 132 and 136 are each dimensioned to accommodate a pair of support members. For example, slot 132 contains a support member for the Far-X and the Far-Inhibit needles while slot 136 contains a support member for the Near-X needles and a support member for the Near-Inhibit needles. As is perhaps obvious, the terms far and near are taken relative to the position occupied by the operator, the needles closest to him being the near set. By selectively closing one or more of the switches 170 through 178 one or more of the solenoid valves 206 through 216 may be opened to supply air to one or more of the cylinders 216 through 226. When air is supplied to these air cylinders, the pull-down needles attached to their actuator rods are raised into a position wherein the eyes of the needles are aligned with the apertures in the cores.

When the switch 180 is closed current flows from the voltage source and through the conductors 188 and 190 to energize a solenoid actuated butterfly valve 232. A tube 234 connects the input of this valve to a vacuum supply 236 and a tube 238 connects the output of the valve to the core nest manifold 240. When the switch 180 is closed, then, a vacuum is applied to the core nest to hold the individual cores on edge in a predetermined position.

Now that the details of the construction of the filament threading apparatus of the present invention have been described in detail, consideration will be given to the sequence of events taking place during the stringing of the X-drive, the Y-drive and the Inhibit lines.

When stringing the Y-drive lines, the rotatable nest table 112 is positioned as shown in FIG. 2 with the single bank of pull-down needles presented to the wire prior to and immediately following the penetration in the core array. These are respectively the Far-Y and Near-Y needles. Although all of the filaments are fed through the core array, only half of them need be threaded through pull-down needles. This is because in the preferred form of this invention the printed circuit frame employed is designed so that half of the conductive terminal tabs are located on the upper side of the frame while the remaining terminals are located on the underside of the frame. Pull-down needles are therefore only required to pull the extremities of half of the filaments in the array through the apertures in the boards to the underside. In stringing the Y-drive lines, the operator loads the core nest with magnetic cores in the manner described, inserts the core nest itself in the manifold and then closes the switch 180 to turn on the vacuum in the core nest manifold. He next selects the appropriate slotted transfer bars 148 and 150 for stringing the Y-drive lines and clamps them in place using the swivel arm clamps 152 and 154 and the clamps 160. With the cores in position and the slotted transfer bars in place, the operator next closes the switch 164 momentarily, which energizes the shaker table 20, turns on the air supply to the spool axles, and starts the reel-off motor 192. After a desired amount of wire has been unreeled from the spools, the operator again opens switch 164 and closes the feed switch 168 and the oscillate switch 166. The closing of the feed switch energizes the drive roller motor 68 causing the filaments to be advanced through the eyes of the eyes of the Far-Y needles and through the array of aligned cores. The closing of the oscillate switch 166 energizes the motor 94. Motor 94 drives the cams 84 and 86 to cause the filaments to be rotated about their own longitudinal axes as they are advanced. The rotation of the wires as they are advanced permits a relatively straight line searching control to be achieved, which is of prime importance in successfully threading the wires through the individual cores.

After the filaments have passed through the core array and through the eyes of the Near-Y bank of needles, the operator depresses the cutting blade 104 to sever the wire at the cutoff block 110. The operator next opens switch 174 and 176 in turn to cause the Far-Y and Near-Y pull-down needles to retreat back into the slots 134 and 138 in the core nest manifold. In moving to this last mentioned position, the needles through which the filaments have passed, move downward through the apertures in the printed circuit board to locate the ends of the filaments in their respective circuit tabs.

In order to thread the perforated core elements with the X-drive and Inhibit filaments, the rotatable table 112 is moved to its foremost position along the guide tracks 120 and then rotated so that the double row of needles is presented to the filaments prior to and immediately following their penetration into the core array. After the nest has been rotated 90° the table is again slid to its rearmost position abutting the forward wire guide 102. A second set of slotted transfer bars for stringing the X-drive lines and inhibit lines are then inserted and clamped against the top surface of the printed circuit frame. Again the operator momentarily closes the switch 164 to reel off a predetermined length of wires from the spools.

By way of explanation, it should be mentioned that the X-drive and Inhibit lines run parallel to one another and actually thread the same cores. However, the threading of these lines is done in two steps. Because the X-drive and Inhibit lines are separate and distinct circuits, they necessitate different terminations on the printed circuit frame. Therefore, one row of needles serves to locate the X-lines and a second row of needles serves to locate the Inhibit lines.

Figure 6:
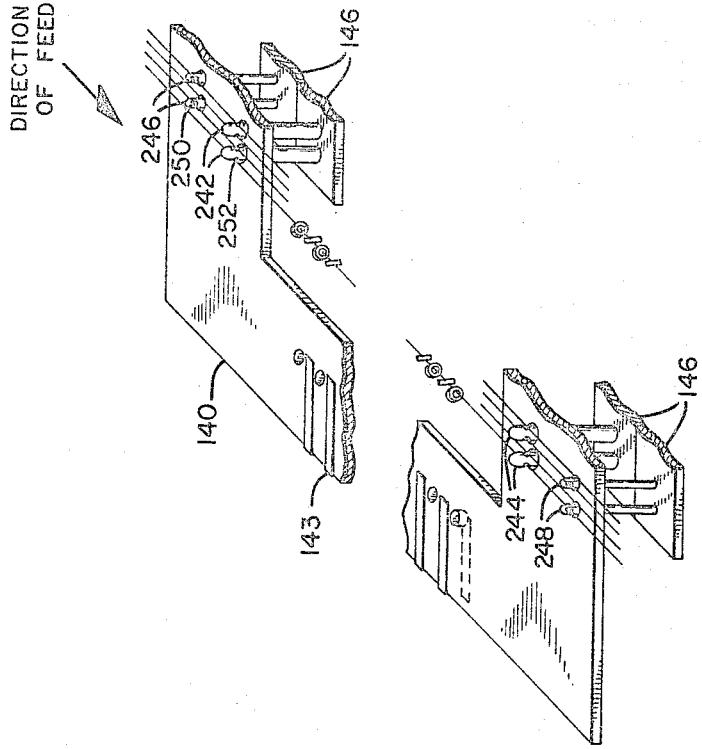
FIG. 6 is a pictorial representation of a printed circuit frame showing the location of the X and Inhibit pull-down needles.

Referring to FIGURE 6 which illustrates an enlarged pictorial view of a printed circuit memory frame 140, it can be seen that the Far Inhibit needles 242 and the Near Inhibit needles 244 are of the same design and shape as the Far and Near X pull-down needles 246 and 248. As is clearly illustrated, the Inhibit needles 242 and 244 have a larger diameter than the X pull-down needles 246 and 248. Also, instead of having a central aperture 250 constituting the eye, as do the X and Y pull-down needles, the Inhibit needles have a notched out area 252 on opposing sides thereof. The diameter of the Inhibit needles is dimensioned such that a single Inhibit needle is able to coact with a pair of adjacent filaments. Hence, when the switch 178 (FIGURE 5) is opened to de-energize solenoid 214, the Inhibit needles will be withdrawn, each pulling two filaments through a given aperture in the board. The extremities of the two wires may, therefore, subsequently be soldered to a common termination tab so as to form a continuous electrical series circuit through all of the elements in the matrix.

Another feature to be noted from FIG. 6 is the manner in which the apertures in the frame for the X-needles are staggered with respect to the apertures for the Inhibit-needles. Because of this staggered relationship only one filament of an adjacent pair of filaments passes through the eye of an X-pull-down needle whereas both pass through the notched eyes of Inhibit pull-down needles.

Returning now to the description of the operation of the apparatus, the operator first depresses the switch 170 and 172 to position the Far-X and Near-X bank of pull-down needles 246 and 248 in the path of the advancing filaments and then depresses switch 178 to position the Near and Far Inhibit needles in a corresponding position. Next, the feed switch 168 and the oscillator switch 166 are both closed to cause the filaments to be advanced through the Far-X needles, through the Far-Inhibit needles, then through the core array, through the Near-Inhibit needles and finally through the Near-X needles. When this step is completed the operator again opens the switch 166 and 168 to stop the advancement of the filaments. He subsequently operates the cutting knife to sever the filament and then opens the switch 178 to locate the extremities of the Inhibit filaments in their proper circuit termination tabs. When the Inhibit needles are withdrawn the extremities of the filaments are pulled out of the eyes of the X-drive line needles and under the printed circuit frame, thereby leaving the eyes of the X-pull-down needles unoccupied for the final step which is the threading of the X-drive filaments. In performing this final step, the operator again reels off a supply of wire by closing switch 164 and causes it to be rotated and advanced through the cores by closing switches 166 and 168. At the completion of the stringing of the X-drive wires, the lines are severed and the switches 170 and 172 are opened causing the Far-X and Near-X needles to move downward through the apertures provided therefor in the printed circuit board. As is true with the Y-drive lines, only half of the X-drive lines are pulled through apertures to the underside of the frame, the other half remaining on the upper surface of the frame. The printed circuit frame can now be removed from the machine and the wires may be permanently connected to the printed circuit frame by a soldering process.

As was stated earlier, the purpose of the track 120 is to permit the turntable 112 is to be moved back from its position in abutment with the anvil 110 so that the corners of the manifold will clear the anvil when the turntable is rotated 90°. To achieve this same result, the apparatus of FIG. 2 may be modified to eliminate the need for the slide track 120. This modification includes mounting the core nest manifold on the actuator arm of a pneumatic cylinder arranging it so that when the cylinder is activated, the nest and manifold are raised above the level of the pressure arm 74. When in this raised position it is possible to rotate the table without having the manifold interfere with the permanently mounted drive roller assembly. In implementing this modification it is also possible to eliminate the need for the four slotted transfer bars for guiding the filaments into the array of cores. The top surface of the manifold itself can be provided with wire guiding notches such that when the printed circuit frame is placed upon the manifold so as to surround the core nest, it acts as a cover to prevent the filaments from falling out of the notches. In this modified embodiment the filaments are threaded beneath the printed circuit frame rather than on top of it. Hence, instead of employing pull-down needles to locate the extremities of the filaments through the apertures in the printed circuit frame, needles with a notch in the top surface thereof may be employed to push the ends of the filaments upward through the apertures in the printed circuit frame.

While there has been described a preferred embodiment of the present invention, many variations will be suggested to those skilled in the art and certain of these variations have already been discussed. Still further modifications will be apparent, however, and the foregoing description is therefore meant to be illustrative only and should not be considered limitative to the invention. All such modifications as are in accord with the principles described are meant to fall within the scope of the appended claims.

What is claimed is:

1. Apparatus for threading filaments simultaneously through a plurality of apertured elements comprising: means for holding said elements in at least one row with their apertures aligned; means for supplying a continuous filament for said row; a pair of drive rollers frictionally engaging said filament adapted to be rotated advancing said filament into said aligned apertures; and means cooperating with said roller means for imparting a rotational motion to said filaments about their direction of advancement as they are advanced into said apertures.

2. Apparatus for threading a plurality of filaments simultaneously through a plurality of apertured elements comprising: means for holding said elements with their apertures in an aligned relationship with one another in a plurality of parallel rows; means for supplying a continuous filament for said plurality of parallel rows; means for advancing said filaments into said aligned apertures; and means cooperating with said advancing means for imparting a rotational motion to said filaments about their direction of advancement as they are advanced into said apertures.

3. Apparatus for threading a plurality of filaments simultaneously through a plurality of apertured elements comprising: means for holding said elements with their apertures in an aligned relationship with one another in a plurality of parallel rows; a plurality of spools for supplying continuous filaments for said plurality of rows; at least two drive rollers frictionally engaging said filaments; means connected in a driving relationship to said rollers for advancing said filaments into said aligned apertures; and means connected to said rollers for imparting a rotational motion to said filaments about their direction of advancement as they are advanced into said apertures.

4. In apparatus for threading a plurality of filaments simultaneously through a plurality of apertured elements, the combination comprising: means for holding said elements with their apertures in an aligned relationship with one another in a plurality of parallel rows; a plurality of spools for supplying continuous filaments for said plurality of rows; mounting means for said spools for allowing rotation thereof as said filament is unwound therefrom; at least two drive rollers frictionally engaging said filaments adapted to be rotated for unwinding said filament from said spools and advancing said filaments into said aligned apertures; and means for imparting vibratory motion to said plurality of spools as said drive rollers are rotated for reducing the frictional drag between said spools and said mounting means.

5. Apparatus for threading a plurality of filaments simultaneously through a plurality of apertured elements, comprising: means for holding said elements with their apertures in an aligned relationship with one another in a plurality of parallel rows; a plurality of spools for supplying continuous filaments for said plurality of rows; mounting means for said spools for allowing rotation of said spools as said filaments are unwound therefrom; a pair of drive rollers frictionally engaging said filament adapted to be rotated for unwinding said filament from said spools and advancing said filaments into said aligned apertures; means for imparting vibratory motion to said plurality of spools as said drive rollers are rotated for reducing the frictional drag between spools and said mounting means; and means cooperating with said drive rollers for imparting rotational motion to said filaments about their direction of advancement as they are advanced into said apertures.

6. In a filament dispensing device, the combination comprising: a plurality of spools having a central aperture therethrough and a continuous filament wound thereon; a rod adapted to be passed through the central aperture on said plurality of spools for maintaining them in substantially parallel relationship with one another; a pair of rotatable drive rollers frictionally engaging said filaments for unwinding said filaments from said spools as said drive rollers are rotated; a table adapted to be vibrated as said drive rollers are rotated; and means for mounting said rod on said table such that the vibration thereof reduces the frictional drag between said spools and said rod as said filaments are unwound.

7. The combination as in claim 6 wherein said rod is a hollow tube having a plurality of holes passing through the walls thereof.

8. Apparatus as in claim 7 and further including a source of pressurized air and means connecting said source to said tube such that the air passing through said holes further reduces the frictional drag between adjacent spools mounted on said rod as said filaments are unwound.

9. Apparatus for threading a plurality of filaments simultaneously through a plurality of apertured elements comprising: means for holding said elements with their apertures in an aligned relationship with one another in a plurality of parallel rows; a plurality of spools for supplying continuous filaments for said plurality of rows; a base; at least two drive rollers mounted on separate shafts adapted to frictionally engage said filaments; bearing means connected to said base for mounting said drive rollers for rotational motion about parallel axes with the shafts having a portion thereof extending through said bearing means; means connected in a driving relationship to at least one of said rollers for advancing said filaments into said aligned apertures; a cam shaft rotatably mounted with respect to said base and having a pair of cams positioned thereon for cooperation with the extending portion of said shafts; return means mounted on said shafts for urging the ends of said shafts against said pair of cams; and means for rotating said cam shaft for imparting a back-and-forth motion to said rollers in a direction transverse to the direction of advancement of said filaments whereby the filaments are maintained in a fixed axial position with respect to the axes of the roller shafts.

10. In apparatus for threading a plurality of filaments simultaneously through a plurality of apertured elements, comprising: means for holding said elements with their apertures in an aligned relationship with one another in a plurality of parallel rows; a plurality of spools for supplying continuous filaments for said plurality of rows; a pair of drive rollers mounted on separate shafts; bearing means for supporting said shafts on each side of said rollers with the ends thereof extending through said bearing means such that said rollers are adapted to be rotated about parallel axes and to frictionally engage said filaments for advancing said filaments into said aligned apertures; a pair of eccentric cams mounted in contact with the ends of said shafts; return means mounted on said shafts for urging the ends of said shafts against said pair of cams, said cams adapted to be rotated for imparting reciprocating motion to said rollers in a direction transverse to the direction of advancement of said filaments whereby the filaments are rotated but are maintained in a fixed axial position with respect to the axes of the roller shafts.

11. Apparatus for threading a plurality of filaments simultaneously through a plurality of apertured elements comprising: means for holding said elements with their apertures in an aligned relationship with one another in a plurality of parallel rows; a plurality of spools for supplying continuous filaments for said plurality of rows; a base; drive rollers mounted on separate shafts adapted to frictionally engage said filaments; means connected to said base for mounting said drive rollers for rotational motion about parallel axes, said shafts having a portion thereof extending through said bearing means; driving means connected to at least one of said rollers for advancing said filaments into said aligned apertures; a cam shaft rotatably mounted with respect to said base and having a pair of cams positioned thereon; return means mounted on said shafts for urging the ends of said shafts against said pair of cams; a pair of U-shaped tie rods and means for operatively connecting said tie rods to the extending portion of said shafts, said tie rods being positioned to encompass said pair of cams; and means for rotating said cam shaft for imparting a back-and-forth motion to said rollers in a direction transverse to the direction of advancement of said filaments whereby said filaments are rotated but are maintained in a fixed axial position with respect to the axes of the roller shafts.

12. Apparatus as in claim 11 wherein said cams are arranged to effect equal and opposite cyclic motion of said rollers.

13. Apparatus for threading a plurality of filaments simultaneously through a plurality of apertured elements comprising: means for holding said elements with their apertures in an aligned relationship with one another in a plurality of parallel rows; means for supplying a continuous filament for said plurality of parallel rows; means for advancing said filaments into said aligned apertures; and means cooperating with said advancing means for imparting a rotational motion to said filaments about their direction of advancement as they are advanced into said apertures; U-shaped tie rods and means for operatively connecting said tie rods to the filament advancing means and to the means cooperating with said advancing means for imparting rotational motion to said filaments such that a reciprocating motion is imparted to said filament advancing means.

14. Apparatus for simultaneously threading a plurality of continuous filaments through a plurality of apertured elements and for securing said elements to a frame comprising: nest means for holding said elements with their apertures in an aligned relationship with one another in a plurality of parallel rows and columns; a plurality of spools for supplying a continuous filament for each of said rows; drive roller means for unwinding said filaments from said spools; a frame having four sides defining a rectangular opening adapted to surround said nest means, the opposing sides of said frame each having a plurality of holes corresponding to the number of rows of said elements; filament pull-down means including a plurality of needles having eyes therein, said needles being secured to and projecting from a support member and positioned such that said needles are adapted to pass through said plurality of holes; means for driving said rollers for advancing said filaments through the eyes of the needles passing through the holes on one of said sides, then through the apertures in the elements in each of said rows, then through the eyes of the needles passing through the holes on the side opposite said one side; knife means mounted between said drive roller means and said nest means for severing said filaments; and means for moving said needles so as to thread said filaments through said plurality of holes.

15. Apparatus for simultaneously threading a plurality of continuous filaments through a plurality of apertured elements and for securing said elements to a frame comprising: nest means for holding said elements with their apertures in an aligned relationship with one another in a plurality of parallel rows and columns; a plurality of spools for supplying a continuous filament for each of said rows; drive roller means for unwinding said filaments from said spools; a first filament guide means located between said spools and said drive roller means for maintaining said filaments in a parallel relationship with one another as said filaments enter said drive roller means; a frame having four sides defining a rectangular opening adapted to surround said nest means, the opposing sides of said frame each having a plurality of holes corresponding to the number of rows of said elements; filament pull-down means including a plurality of needles having eyes therein, said needles being secured to and projecting from a support member and positioned such that said needles are adapted to pass through said plurality of holes; second filament guide means positioned between said drive roller means and said filament pull-down means for guiding said filaments into the eyes of the said needles; means for driving said rollers for advancing said filaments through the eyes of the needles passing through the holes on one of said sides, then through the apertures in the elements in each of said rows, then through the eyes of the needles passing through the holes on the side opposite said one side; and means for withdrawing said needles so as to thread said filaments through said plurality of holes.

16. Apparatus as in claim 15 wherein said means for withdrawing said needles includes a source of pressurized air; a pneumatic piston connected to said support member; a solenoid operated valve connected intermediate said source of air and said piston; and circuit means including switch means for energizing said solenoid valve upon closure of said switch means to control the flow of air to said piston.

17. A machine for simultaneously threading a plurality of wires through an array of toroidal magnetic cores comprising in combination: a work station; core holding means adapted to be located at said work station for holding a plurality of toroidal magnetic cores in predetermined coordinate locations defining a plurality of rows and columns, with each core having its aperture aligned with the apertures of all cores in one row and one column; means for holding a plurality of continuous wires; a pair of driven rollers frictionally engaging said wires and adapted to be rotated for simultaneously advancing said plurality of wires toward said work station and through the apertures of the cores in each column; means for imparting a rotational motion to said wires about their direction of advancement as they are advanced into said apertures; means for cutting said wires subsequent to their advancement through all said cores in said plurality of columns; means for withdrawing said core holding means from said work station; and means for allowing rotation of said core holding means such that upon the return of said core holding means to said work station the rotation of said drive rollers causes said plurality of wires to be advanced through the apertures of all of said cores in said plurality of rows.

18. Apparatus as in claim 15 wherein said means for withdrawing said core holding means comprises: a set of parallel tracks fixedly mounted with respect to said work station; a circular plate having an inwardly extending groove around the periphery thereof for accommodating said set of tracks; and means for securing said core holding means to the surface of said circular plate, the arrangement being such that said circular plate can be slidably withdrawn from said work station and then rotated.

19. A method of threading continuous filaments through an array of apertured elements comprising the steps of: positioning a plurality of said elements in predetermined coordinate locations of rows and columns with the aperture of each element being aligned with all of the apertures of the filaments in at least one row and one column; advancing at least one filament for each of said rows through the aligned apertures in said elements and simultaneously imparting a reciprocating rotational motion to said filaments about their direction of advancement as they are advanced into said apertures.

20. A method of threading continuous filaments through an array of apertured elements and securing the threaded array to a frame comprising the steps of: positioning a pluarlity of said elements in predetermined coordinate locations of rows and columns with the aperture of each element being aligned with all of the apertures of the elements in at least one row and one column; advancing at least one filament through the aligned apertures in said elements in each of said rows; imparting a reciprocating rotational motion to said filaments about their direction of advancement as they are advanced into said apertures; cutting said filaments at the completion of the advancing step; and inserting the extremities of selected ones of said filaments through holes provided in said frame.

References Cited
UNITED STATES PATENTS

| | | | |
|---|---|---|---|
| 2,285,690 | 6/1942 | Veit | 226—98 |
| 2,448,217 | 8/1948 | Gonsalves. | |
| 2,958,126 | 11/1960 | Shaw et al. | 29—433 |
| 2,978,800 | 4/1961 | Blain | 29—230 |

JOHN F. CAMPBELL, *Primary Examiner.*

J. W. BOCK, C. E. HALL, *Assistant Examiners.*

UNITED STATES PATENT OFFICE
CERTIFICATE OF CORRECTION

Patent No. 3,331,126             July 18, 1967

Frederick A. Fielder et al.

It is hereby certified that error appears in the above numbered patent requiring correction and that the said Letters Patent should read as corrected below.

Column 1, line 40, for "cross" read -- cores --; column 3 line 45, for "half-sleev" read -- half-sleeve --; column 6, line 39, for "circuitf rame" read -- circuit frame --; column 7, line 35, for "notice" read -- motion --; column 8, line 47, strike out "eyes of the"; column 10, line 66, for "simulaneously" read -- simultaneously --; column 14, line 4, for "driven" read -- drive --.

Signed and sealed this 22nd day of October 1968.

(SEAL)
Attest:

Edward M. Fletcher, Jr.
Attesting Officer

EDWARD J. BRENNER
Commissioner of Patents